United States Patent
Liao et al.

(10) Patent No.: US 11,529,535 B2
(45) Date of Patent: Dec. 20, 2022

(54) CATALYTIC FUEL TANK INERTING SYSTEMS

(71) Applicant: Hamilton Sundstrand Corporation, Charlotte, NC (US)

(72) Inventors: Xiaohong Liao, Andover, CT (US); Beakal T. Woldemariam, South Windsor, CT (US); Brian R. Shea, Windsor, CT (US); Earl Jean LaVallee, Glastonbury, CT (US); Eric Surawski, Hebron, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 336 days.

(21) Appl. No.: 16/821,389

(22) Filed: Mar. 17, 2020

(65) Prior Publication Data
US 2021/0291003 A1   Sep. 23, 2021

(51) Int. Cl.
| | |
|---|---|
| *A62C 99/00* | (2010.01) |
| *B01J 19/14* | (2006.01) |
| *B01J 12/00* | (2006.01) |
| *B01J 19/00* | (2006.01) |
| B64D 37/32 | (2006.01) |
| B01D 53/26 | (2006.01) |

(52) U.S. Cl.
CPC ......... *A62C 99/0018* (2013.01); *B01J 12/007* (2013.01); *B01J 19/0013* (2013.01); *B01J 19/14* (2013.01); *B01D 53/265* (2013.01); *B01J 2219/00103* (2013.01); *B64D 37/32* (2013.01)

(58) Field of Classification Search
CPC .................................................... B64D 37/32
See application file for complete search history.

(56) References Cited

U.S. PATENT DOCUMENTS

| | | | | |
|---|---|---|---|---|
| 3,847,298 | A | * | 11/1974 | Hamilton ................. B01J 19/14 252/372 |
| 8,499,567 | B2 | | 8/2013 | Hagh et al. |
| 9,963,792 | B2 | | 5/2018 | Rheaume |
| 10,479,522 | B2 | | 11/2019 | Emerson et al. |
| 10,507,936 | B2 | | 12/2019 | Thibaud |

(Continued)

FOREIGN PATENT DOCUMENTS

| | | |
|---|---|---|
| CN | 108557090 A | 9/2018 |
| EP | 3586927 A2 | 1/2020 |

(Continued)

OTHER PUBLICATIONS

European Search Report for European Application No. 21158268.9, dated Jul. 28, 2021, 8 pages.

*Primary Examiner* — Christopher D Hutchens
(74) *Attorney, Agent, or Firm* — Cantor Colburn LLP

(57) ABSTRACT

Fuel tank inerting systems are described. The systems include a fuel tank, a catalytic reactor arranged to receive a reactant mixture comprising a first reactant and a second reactant to generate an inert gas to be supplied to the fuel tank to fill an ullage space of the fuel tank, a condenser heat exchanger arranged between the catalytic reactor and the fuel tank and configured to cool an output from the catalytic reactor, and a fan assembly arranged within an inerting system flow path upstream of the catalytic reactor, wherein the fan assembly is arranged within a gas flow having a temperature of at least 185° C.

20 Claims, 5 Drawing Sheets

(56) References Cited

U.S. PATENT DOCUMENTS

| | | | |
|---|---|---|---|
| 2008/0099618 A1* | 5/2008 | Zaki | B01D 19/0073 |
| | | | 244/135 R |
| 2008/0128048 A1* | 6/2008 | Johnson | B64D 37/32 |
| | | | 141/59 |
| 2010/0064886 A1* | 3/2010 | Surawski | B64D 37/32 |
| | | | 95/138 |
| 2012/0087807 A1* | 4/2012 | Buchwald | B64D 37/32 |
| | | | 417/54 |
| 2012/0325811 A1* | 12/2012 | Hagh | B64D 37/32 |
| | | | 423/210 |
| 2015/0344145 A1* | 12/2015 | Epstein | F17C 3/00 |
| | | | 244/135 C |
| 2018/0148190 A1 | 5/2018 | Surawski | |
| 2018/0155050 A1 | 6/2018 | Surawski et al. | |
| 2018/0354644 A1* | 12/2018 | Massie | B01D 53/864 |
| 2019/0389593 A1 | 12/2019 | Emerson et al. | |
| 2020/0309376 A1* | 10/2020 | Prociw | F23D 11/38 |

FOREIGN PATENT DOCUMENTS

| | | |
|---|---|---|
| EP | 3666660 A1 | 6/2020 |
| WO | 2020096954 A1 | 5/2020 |
| WO | 2021011152 A1 | 1/2021 |

\* cited by examiner

CATALYTIC FUEL TANK INERTING SYSTEMS

BACKGROUND

The subject matter disclosed herein generally relates to fuel tank inerting systems and, more particularly, to fuel tank inerting systems configured to supply inert gas, such as for onboard aircraft.

In general, aircraft pneumatic systems, including air conditioning systems, cabin pressurization and cooling, and fuel tank inerting systems are powered by engine bleed air. For example, pressurized air from an engine of the aircraft is provided to a cabin through a series of systems that alter the temperatures and pressures of the pressurized air. To power this preparation of the pressurized air, generally the source of energy is the pressure of the air itself.

The air bled from engines may be used for environmental control systems, such as used to supply air to the cabin and to other systems within an aircraft. Additionally, the air bled from engines may be supplied to inerting apparatuses to provide inert gas to a fuel tank. In other cases, the air may be sourced from compressed ram air.

Regardless of the source, typically the air for fuel tank inerting is passed through a porous hollow fiber membrane tube bundle known as an "air separation module." A downstream flow control valve is controlled or passively operated to apply back pressure on the air separation module to force some amount of air through the membrane as opposed to flowing through the tube. Oxygen passes more easily through the membrane, leaving only nitrogen enriched air to continue through the flow control valve into the fuel tank. Typically, air separation modules employ a dedicated ram air heat exchanger in conjunction with a bypass valve.

BRIEF DESCRIPTION

According to some embodiments, fuel tank inerting systems are provided. The fuel tank inerting systems include a fuel tank, a catalytic reactor arranged to receive a reactant mixture comprising a first reactant and a second reactant to generate an inert gas to be supplied to the fuel tank to fill an ullage space of the fuel tank, a condenser heat exchanger arranged between the catalytic reactor and the fuel tank and configured to cool an output from the catalytic reactor, and a fan assembly arranged within an inerting system flow path upstream of the catalytic reactor, wherein the fan assembly is arranged within a gas flow having a temperature of at least 185° C.

In addition to one or more of the features described above, or as an alternative, further embodiments of the fuel tank inerting systems may include that the fan assembly includes a variable speed fan.

In addition to one or more of the features described above, or as an alternative, further embodiments of the fuel tank inerting systems may include that the fan assembly includes a fan housing defining a fan cooling cavity and a fan motor arranged within the fan cooling cavity and an air temperature within the fan cooling cavity is 70° C. or less.

In addition to one or more of the features described above, or as an alternative, further embodiments of the fuel tank inerting systems may include that the fan assembly further includes a fan shaft operably coupled to the fan motor and configured to be driven by the fan motor, a fan hub arranged on an end of the fan shaft, and one or more fan blades extending from the fan hub, wherein the fan blades extend into the inerting system flow path.

In addition to one or more of the features described above, or as an alternative, further embodiments of the fuel tank inerting systems may include that the fan housing comprises an insulating material.

In addition to one or more of the features described above, or as an alternative, further embodiments of the fuel tank inerting systems may include that the inerting system flow path include a hot cycle junction downstream from the catalytic reactor and upstream from the condenser heat exchanger and a cool cycle junction downstream from the condenser heat exchanger and upstream from the fuel tank.

In addition to one or more of the features described above, or as an alternative, further embodiments of the fuel tank inerting systems may include that a portion of inert gas may be directed upstream from at least one of the hot cycle junction and the cool cycle junction.

In addition to one or more of the features described above, or as an alternative, further embodiments of the fuel tank inerting systems may include that cool inert gas from the cool cycle junction is supplied to the fan assembly to provide cooling to the fan assembly.

In addition to one or more of the features described above, or as an alternative, further embodiments of the fuel tank inerting systems may include that the hot cycle junction is configured to direct hot inert gas to a location upstream of the catalytic reactor to be mixed with the reactant mixture.

In addition to one or more of the features described above, or as an alternative, further embodiments of the fuel tank inerting systems may include a hot cycle flow controller arranged between the hot cycle junction and the fan assembly, wherein the hot cycle flow controller is configured to control a flow of hot inert gas.

In addition to one or more of the features described above, or as an alternative, further embodiments of the fuel tank inerting systems may include that the hot cycle flow controller is one of a valve and an orifice arranged along the inerting system flow path.

In addition to one or more of the features described above, or as an alternative, further embodiments of the fuel tank inerting systems may include that the cool cycle junction is configured to direct cool inert gas to a location upstream of the catalytic reactor to be mixed with the reactant mixture.

In addition to one or more of the features described above, or as an alternative, further embodiments of the fuel tank inerting systems may include a cool cycle flow controller arranged between the cool cycle junction and the fan assembly, wherein the cool cycle flow controller is configured to control a flow of cool inert gas.

In addition to one or more of the features described above, or as an alternative, further embodiments of the fuel tank inerting systems may include that the cool cycle flow controller is an isolation valve.

In addition to one or more of the features described above, or as an alternative, further embodiments of the fuel tank inerting systems may include that the fan assembly is configured to receive cool inert gas from a location downstream of the condenser heat exchanger along the inerting system flow path.

In addition to one or more of the features described above, or as an alternative, further embodiments of the fuel tank inerting systems may include that the cool inert gas received by the fan assembly is injected into the reactant mixture within the inerting system flow path.

In addition to one or more of the features described above, or as an alternative, further embodiments of the fuel tank inerting systems may include that the fuel tank inerting system does not include a recirculation heat exchanger.

In addition to one or more of the features described above, or as an alternative, further embodiments of the fuel tank inerting systems may include a water collector arranged downstream from the condenser heat exchanger along the inerting system flow path.

In addition to one or more of the features described above, or as an alternative, further embodiments of the fuel tank inerting systems may include that the gas flow around the fan assembly is between about 185° C. and about 250° C.

In addition to one or more of the features described above, or as an alternative, further embodiments of the fuel tank inerting systems may include that the first reactant is fuel and the second reactant is air.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1A:
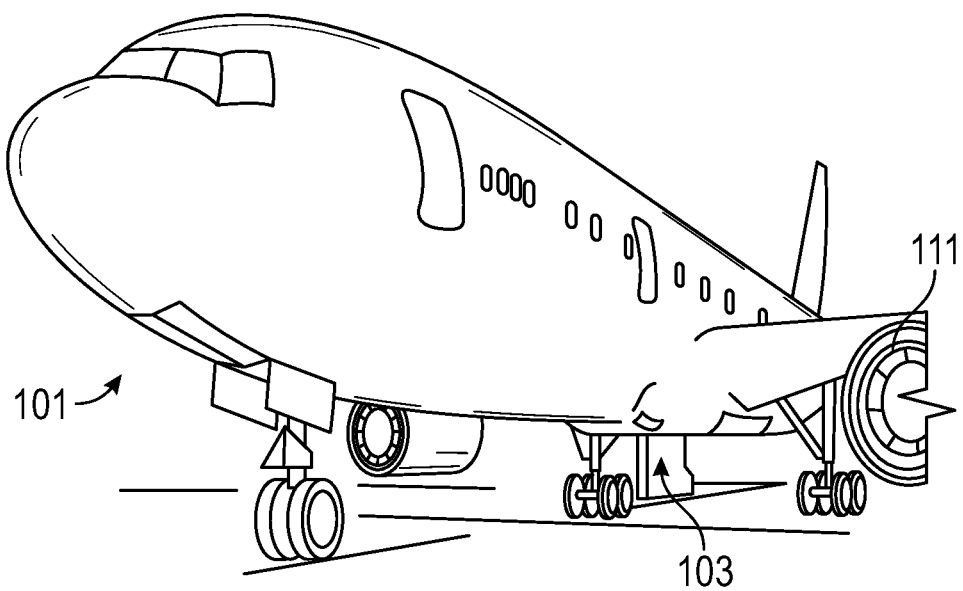
FIG. 1A is a schematic illustration of an aircraft that can incorporate various embodiments of the present disclosure.
Figure 1B:
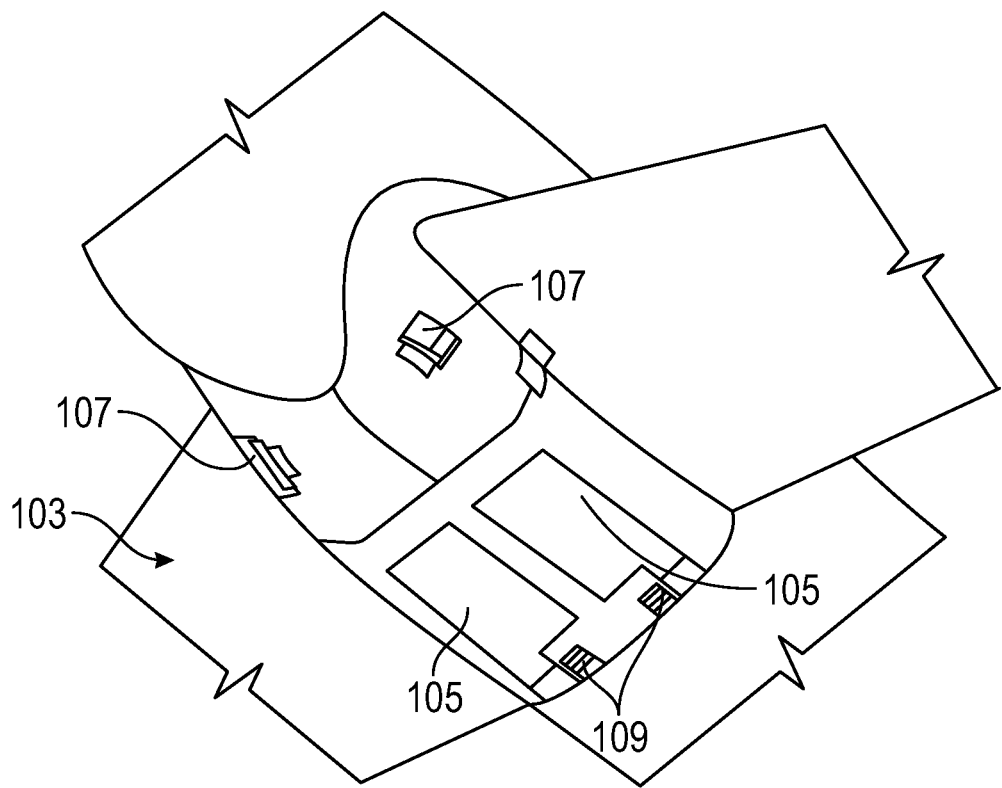
FIG. 1B is a schematic illustration of a bay section of the aircraft of FIG. 1A.

FIGS. 1A-1B are schematic illustrations of an aircraft 101 that can employ one or more embodiments of the present disclosure. As shown in FIGS. 1A-1B, the aircraft 101 includes bays 103 beneath a center wing box. The bays 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhausted through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve a desired oxygen separation. Such systems require a high pressure pneumatic source to drive the separation process across the membrane. Further, the hollow fiber membrane separators commonly used are relatively large in size and weight, which is a significant consideration with respect to aircraft (e.g., reductions in volume and weight of components can improve flight efficiencies). Embodiments provided herein provide reduced volume and/or weight characteristics of inert-gas or low-oxygen supply systems for aircraft. Further, embodiments provided herein can prevent humid air from entering fuel tanks of the aircraft, thus preventing various problems that may arise with some fuel system components. In accordance with some embodiments of the present disclosure, the typical hollow fiber membrane separator is replaced by a catalytic system (e.g., $CO_2$ generation system), which can be, for example, smaller, lighter, and/or more efficient than the typical fiber membrane separators. That is, in accordance with embodiments of the present disclosure, the use of hollow fiber membrane separators may be eliminated.

A function of fuel tank flammability reduction systems in accordance with embodiments of the present disclosure is accomplished by reacting a small amount of fuel vapor (e.g., a "first reactant") with a source of gas containing oxygen (e.g., a "second reactant"). The product of the reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material is used to induce a chemical reaction, including, but not limited to, precious metal materials. The carbon dioxide that results from the reaction is an inert gas that is mixed with nitrogen naturally found in fresh/ambient air, and is directed back within a fuel tank to create an inert environment within the fuel tank, thus reducing a flammability of the vapors in the fuel tank. Further, in some embodiments, the fuel tank flammability reduction or inerting systems of the present disclosure can provide a functionality such that water vapor from the atmosphere does not enter the fuel tanks during descent stages of flight of an aircraft. This can be accomplished by controlling a flow rate of inert gas into the fuel tank so that a positive pressure is continuously maintained in the fuel tank.

In accordance with embodiments of the present disclosure, a catalyst is used to induce a chemical reaction between oxygen ($O_2$) and fuel vapor to produce carbon dioxide ($CO_2$) and water vapor. The source of $O_2$ used in the reaction can come from any of a number of sources, including, but not limited to, pneumatic sources on an aircraft that supply air at a pressure greater than ambient. The fuel vapor is created by draining a small amount of fuel from an aircraft fuel tank into an evaporator container. The fuel can be heated to vaporize the fuel and generate the first reactant (fuel vapor), such as by using an electric heater, as will be appreciated by those of skill in the art. The fuel vapor is removed from the evaporator container, in some embodiments, by an ejector which can induce a suction pressure that pulls the fuel vapor out of the evaporator container. Such ejectors can utilize elevated pressures of a second reactant source containing $O_2$ (e.g., a pneumatic source) to induce a secondary flow of the ejector which is sourced from the evaporator container. As such, the ejector can be used to mix the extracted fuel vapor with the $O_2$ from a second reactant source.

The mixed air stream (fuel vapor and oxygen or air) is then introduced to a catalyst, which induces a chemical reaction that transforms the $O_2$ and fuel vapor into $CO_2$ and water vapor. Any inert gas species that are present in the mixed stream (for example, nitrogen), will not react and will thus pass through the catalyst unchanged. In some embodiments, the catalyst is in a form factor that acts as a heat exchanger. For example, in one non-limiting configuration, a plate fin heat exchanger configuration is employed wherein a hot side of the heat exchanger would be coated with catalyst material. In such an arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

As noted above, the catalytic chemical reaction generates water vapor. Having water (in any form) enter a primary fuel tank can be undesirable. Thus, in accordance with embodiments of the present disclosure, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses and drops out of the product gas stream (i.e., condenses an output of the catalytic reactor). The liquid water can then be drained overboard. In some embodiments, an optional water separator can be used to augment or provide water separation from the product stream.

In some embodiments, a flow control valve meters a flow of an inert gas (with water vapor removed therefrom) to a predetermined and/or controlled inert gas flow rate. Further, in some embodiments, an optional fan can be used to boost the inert gas stream pressure to overcome a pressure drop associated with ducting and flow lines between the catalyst and a fuel tank into which the inert gas is supplied. In some embodiments, a flame arrestor can be arranged at an inlet to the fuel tank (where the inert gas enters) to prevent any potential flames from propagating into the fuel tank.

Independent of any aircraft flammability reduction systems, aircraft fuel tanks are typically vented to ambient. At altitude, pressure inside the fuel tank is very low and is roughly equal to ambient pressure. However, during descent, the pressure inside the fuel tank needs to rise to equal ambient pressure at sea level (or at whatever altitude the aircraft is landing). The change in pressures requires gas entering the tank from outside to equalize the pressure. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can repressurize the fuel tanks with dry inert gas that is generated as described above and below. The repressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water from entering the fuel tank.

Figure 2:
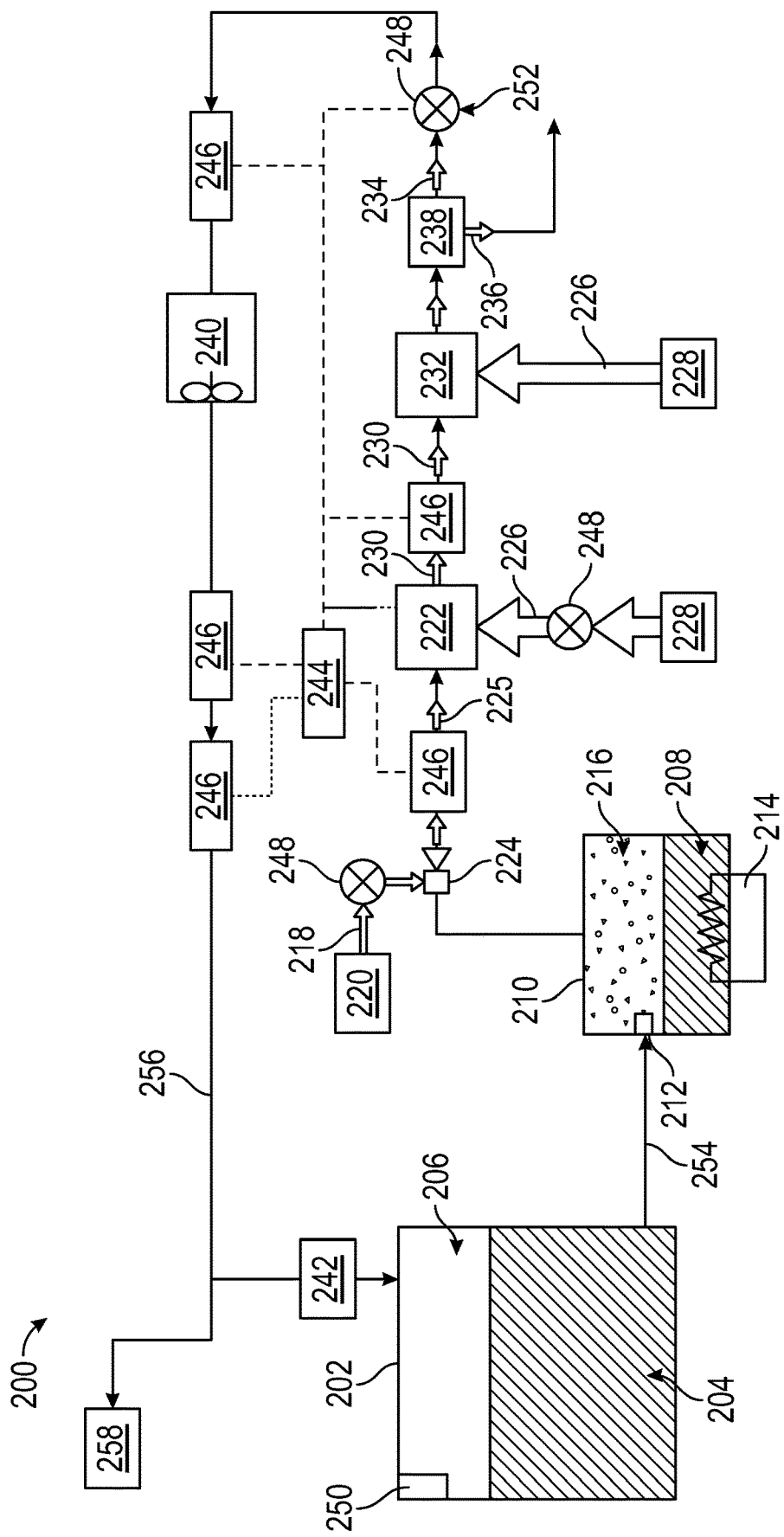
FIG. 2 is a schematic illustration of a fuel tank inerting system that can incorporate embodiments in accordance with an embodiment of the present disclosure.

FIG. 2 is a schematic illustration of a flammability reduction or inerting system 200 utilizing a catalytic reaction to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

In accordance with embodiments of the present disclosure, a portion of the fuel 204 can be extracted as inerting fuel 208 from the fuel tank 202 and into an evaporator container 210. The amount of fuel 204 that is extracted into the evaporator container 210 (i.e., the amount of inerting fuel 208) can be controlled by an evaporator container valve 212, such as a float valve. The inerting fuel 208, which may be in liquid form when pulled from the fuel tank 202, can be vaporized within the evaporator container 210 using a heater 214, such as an electric heater, to generate a first reactant 216. The first reactant 216 is a vaporized portion of the inerting fuel 208 located within the evaporator container 210. The first reactant 216 is mixed with a second reactant 218 which is sourced from a second reactant source 220. The second reactant 218 is air containing oxygen that is catalyzed with the first reactant 216 to generate an inert gas to be supplied into the ullage space 206 of the fuel tank 202. The second reactant 218 can come from any source on an aircraft that is at a pressure greater than ambient, including, but not limited to bleed air from an engine, cabin air, high pressure air extracted or bled from an engine, etc. (i.e., any second reactant source 220 can take any number of configurations and/or arrangements). The first reactant 216 within the evaporator container 210 and the second reactant 218 can be directed into a catalytic reactor 222 by and/or through a mixer 224, which, in some embodiments, may be an ejector or jet pump. The mixer 224 will mix the first and second reactants 216, 218 into a mixed air stream 225.

The catalytic reactor 222 can be temperature controlled to ensure a desired chemical reaction efficiency such that an inert gas can be efficiently produced by the inerting system 200 from the mixed air stream 225. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236. That is, the heat exchanger 232 may condense an output of the catalytic reactor 222. A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be liquid water or water vapor, and thus in the present configuration shown in FIG. 2, a water separator 238 is provided downstream of the heat exchanger 232 to extract the liquid water or water vapor from the catalyzed mixture 230, thus leaving only the inert gas 234 to be provided to the ullage space 206 of the fuel tank 202.

The inerting system 200 can include additional components including, but not limited to, a fan 240, a flame arrestor 242, and a controller 244. Various other components can be included without departing from the scope of the present disclosure. Further, in some embodiments, certain of the included components may be optional and/or eliminated. For example, in some arrangements, the fan 240 and/or the water separator 238 can be omitted. The controller 244 can be in operable communication with one or more sensors 246 and valves 248 to enable control of the inerting system 200.

In one non-limiting example, flammability reduction is achieved by the inerting system 200 by utilizing the catalytic reactor 222 to induce a chemical reaction between oxygen (second reactant 218) and fuel vapor (first reactant 216) to produce carbon dioxide (inert gas 234) and water in vapor phase (byproduct 236). The source of the second reactant 218 (e.g., oxygen) used in the reaction can come from any source on the aircraft that is at a pressure greater than ambient. The fuel vapor (first reactant 216) is created by draining a small amount of fuel 204 from the fuel tank 202 (e.g., a primary aircraft fuel tank) into the evaporator container 210. The inerting fuel 208 within the evaporator container 210 is heated using the electric heater 214. In some embodiments, the first reactant 216 (e.g., fuel vapor) is removed from the evaporator container 210 by using the mixer 224 to induce a suction pressure that pulls the first reactant 216 out of the evaporator container 210. The mixer 224, in such embodiments, utilizes the elevated pressure of the second reactant source 220 to induce a secondary flow within the mixer 224 which is sourced from the evaporator container 210. Further, as noted above, the mixer 224 is used to mix the two gas streams (first and second reactants 216, 218) together to form the mixed air stream 225.

The mixed air stream 225 (e.g., fuel vapor and oxygen or air) is then introduced to the catalytic reactor 222, inducing a chemical reaction that transforms the mixed air stream 225 (e.g., fuel and air) into the inert gas 234 and the byproduct 236 (e.g., carbon dioxide and water vapor). It is noted that any inert gas species that are present in the mixed air stream 225 (for example, nitrogen) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the temperature of the hot mixed gas stream 225 is hot enough to sustain the chemical reaction desired within the catalytic reactor 222, but cool enough to remove the heat generated by the exothermic reaction, thus maintaining aircraft safety and materials from exceeding maximum temperature limits.

As noted above, the chemical reaction process within the catalytic reactor 222 can produce byproducts, including water in vapor form. It may be undesirable to have water (in any form) enter the fuel tank 202. Accordingly, water byproduct 236 can be removed from the product gas stream (i.e., inert gas 234) through condensation. To achieve this, catalyzed mixture 230 enters the heat exchanger 232 that is used to cool the catalyzed mixture 230 such that the byproduct 236 can be removed (e.g., a majority of the water vapor condenses and drops out of the catalyzed mixture 230). The byproduct 236 (e.g., liquid water) can then be drained overboard. An optional water separator 238 can be used to accomplish this function.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient. Thus, as shown in FIG. 2, the fuel tank 202 includes a vent 250. The vent 250 can be passive or active to allow for venting of gas within the ullage 206 to vent out of the fuel tank 202. For example, in some embodiments, the vent 250 can enable venting of gas (and thus pressure) from within the fuel tank 202 and/or pressure that may build within the inerting system 200 (i.e., within the conduits thereof). In embodiments in which the vent 250 can be a passive vent system, with operation of the vent 250 being based upon a pressure within the ullage 206. In other embodiments where the vent 250 is actively controlled, a controller, as described herein, may selectively control operation of the vent 250. Further, in some embodiments, the vent 250 may operate both in a passive and active manner, allowing for control during some operations but also enabling venting if a pressure within the ullage 206 exceeds a threshold of the vent 250.

At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize the pressure. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

As noted above, the controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258, as schematically shown.

A catalytic fuel tank inerting system, such as that shown and described with respect to FIG. 2, may generate $CO_2$ (inert gas) for the fuel tank ullage by reacting a fuel-air mixture in a catalytic reactor. A recirculation heat exchanger and a condenser are typically needed in catalytic inerting systems to maintain a required inlet temperature to catalytic reactor. However, such designs may be subject to various drawbacks, including, for example, high system impedance, relatively large volume, and a need for specific parts or components to assist a start-up procedure.

Figure 3:
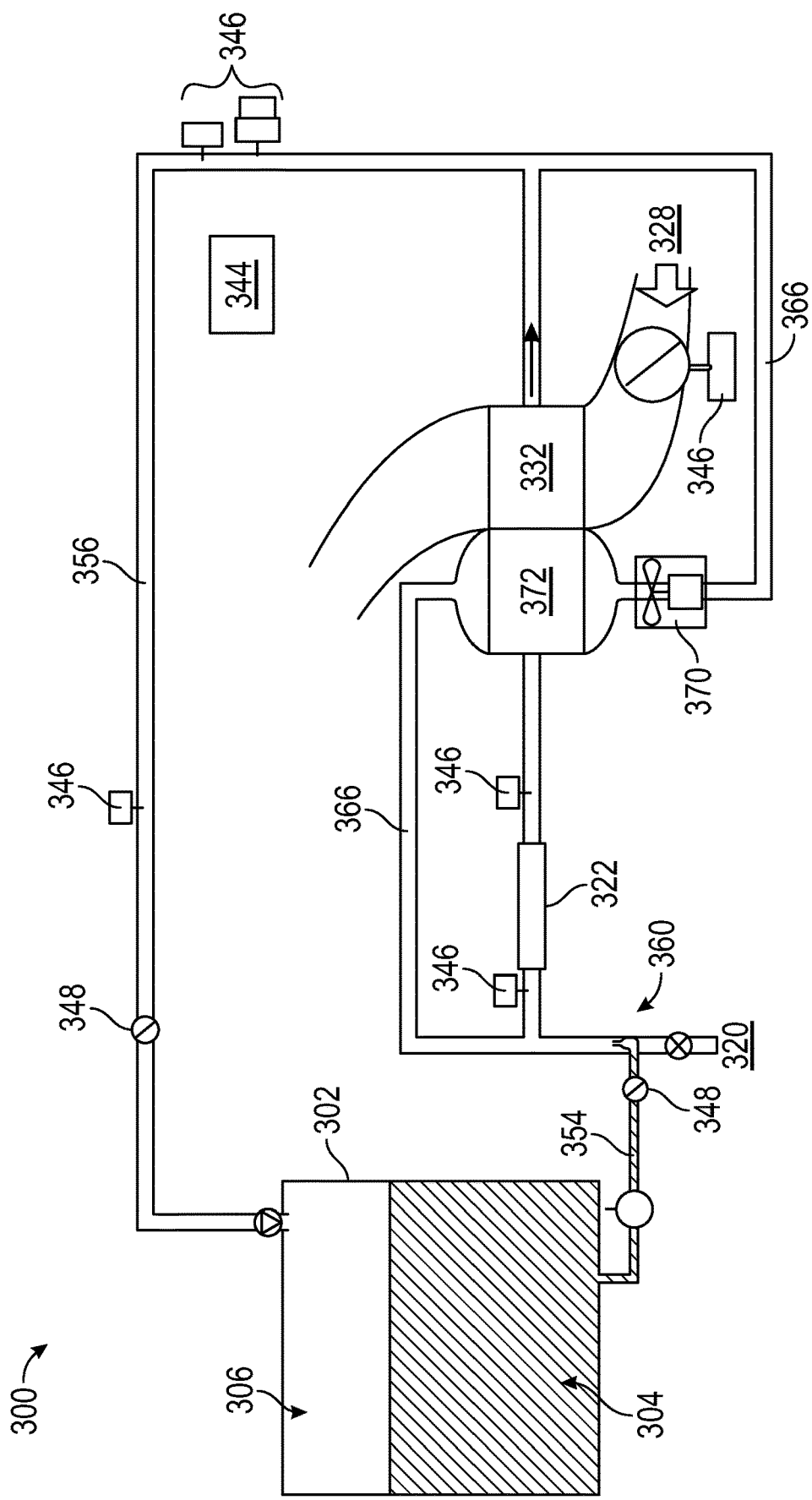
FIG. 3 is a schematic illustration of a fuel tank inerting system that can incorporate embodiments in accordance with an embodiment of the present disclosure.

For example, turning now to FIG. 3, an embodiment of an inerting system 300 is shown. The inerting system 300 may be similar to that shown and described above, and thus similar features may not be shown or discussed for simplicity.

As shown, the inerting system 300 includes a fuel tank 302 having fuel 304 therein, with an ullage space 306 formed as fuel 304 is consumed during use. In this embodiment, an inerting supply line 354 fluidly connects the fuel tank 302 to a metering valve system 360 which can inject fuel, i.e., a first reactant, into a second reactant that is sourced from a second reactant source 320. Thus the first reactant and the second reactant may be mixed. The mixed first and second reactants are then reacted within the catalytic reactor 322 to generate an inert gas for supply into one or more fuel tanks (e.g., fuel tank 302). In this embodiment, a cool air source 328, such as ram air, is provided to enable the condensing function within a heat exchanger 332, as described above. The heat exchanger 332 operates as a condenser on the catalyzed mixture to separate out an inert gas and a byproduct, such as water. The inert gas is then passed along a fuel tank supply line 356 to supply the inert gas to the ullage 306 of the fuel tank 302. The fuel tank 302 can include a vent, as described above.

The inerting system 300 includes a controller 344 that may be operably connected to the various components of the inerting system 300, including, but not limited to, one or more sensors 346 and one or more valves 348, that are arranged at various locations to enable control of the inerting system 300 (e.g., to control fluid flow therethrough). The controller 344 can be configured to receive input from the sensors 346 to control the valves 348 and thus maintain appropriate levels of inert gas within the ullage space 306. The sensors 346 can include an inlet sensor that is arranged upstream of the catalytic reactor 322 and an outlet sensor is arranged downstream from the catalytic reactor 322. The inlet and outlet sensors may be operably connected to the controller 344 such that the controller 344 can monitor inlet and outlet temperatures of the catalytic reactor 322. When the catalytic reactor 322 is generating an inert gas, the outlet temperature will be higher than the inlet temperature. However, if the catalytic reactor 322 is not operating, the inlet and outlet temperatures will be substantially similar. Thus, the controller 344 can monitor the operating status of the catalytic reactor 322.

The catalytic process may be maintained, in part, through the use of a recirculation loop 366. The recirculation loop 366 is configured to extract a portion of the inert gas downstream from the catalytic reactor 322. This extracted inert gas is recycled back to the inlet through the recirculation loop 366. A fan 370, such as a variable speed fan, is configured to drive the recycled inert gas through the recirculation loop 366 which includes a recirculation heat exchanger 372 and then mixes the recycled inert gas back into the mixed first and second reactants. The recirculation heat exchanger 372 is configured to thermally interact the recycled inert gas with the outlet gas from the catalytic reactor 322, thus heating the recycled inert gas. The heated recycled inert gas is mixed with the first and second reactants to control the temperature thereof in order to maintain an operational temperature of the catalytic reactor 322.

In order to reduce the number of components, reduce the volume occupied by inerting systems, and reduce system impedance, embodiments of the present disclosure are directed to, at least, eliminating the recirculation heat exchanger from the system. Additionally, embodiments described herein are directed to locating a fan, or other air mover or driving mechanism, within a hot gas section of the system. The configuration shown in FIG. 3 includes the fan 370 within the recirculation loop 366, which is relatively cool, with the gas having already passed through the heat exchanger 332. This is necessary because the fan 370 may be heat or thermally limited such that it must be contained within a relatively cool section. For example, the fan 370 may be a fan with a motor that is operated at about 75-166° C. and the surrounding air is also about 75-166° C. However, if the fan was located within a hotter section, the fan would fail as the components thereof could not operate in higher temperatures.

Figure 4:
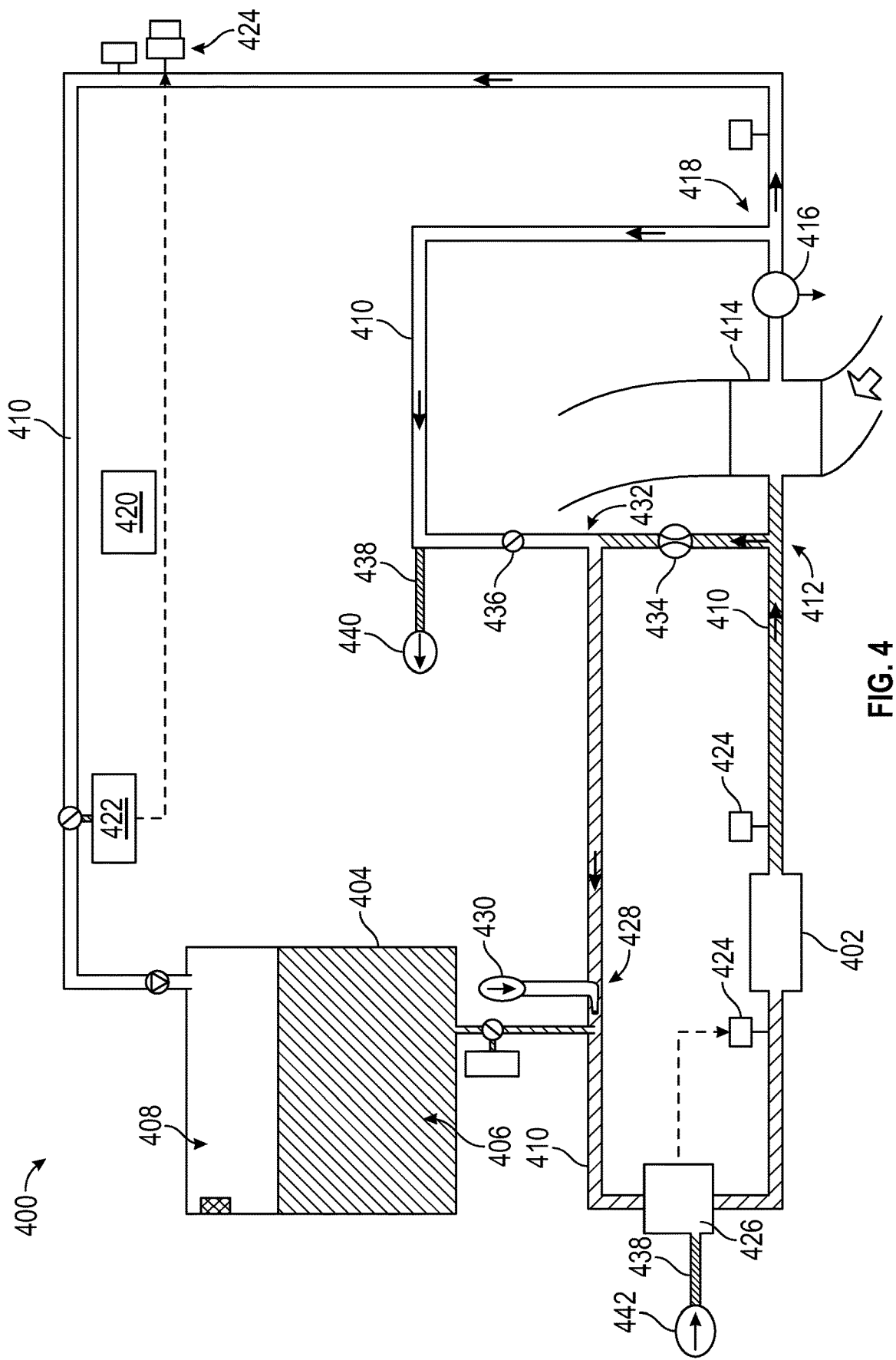
FIG. 4 is a schematic illustration of a fuel tank inerting system in accordance with an embodiment of the present disclosure.

Turning now to FIG. 4, a schematic illustration of an embodiment of an inerting system 400 in accordance with an embodiment of the present disclosure is shown. The inerting system 400 may be similar to that shown and described above, and thus similar features may not be shown or discussed for simplicity. The inerting system 400 enables control of an operating temperature of a catalytic reactor 402 while reducing the number of components as compared to prior systems, such as shown in FIG. 3.

The inerting system 400 is operably connected to a fuel tank 404 with fuel 406 and an ullage 408 to be filled with an inert gas supplied by the inerting system 400. A vaporized fuel and an air mixture can be injected into an inerting system flow path 410 to be supplied into the catalytic reactor 402 to generate an inert gas, as described above. Downstream from the catalytic reactor 402 along the inerting system flow path 410 is a hot cycle junction 412, a condensing heat exchanger 414, a water collector 416, a cool cycle junction 418, and the ullage 408. As will be appreciated by those of skill in the art, other additional features may be included along the inerting system flow path 410, and in some embodiments, some components may be omitted based on the specific system configuration and requirements. The inerting system 400 includes a system controller 420 that may be operably connected to one or more valves 422 and sensors 424. Further, the system controller 420 may be operably connected to one or more additional valves/sensors, as described herein.

In this illustrative embodiment, rather than including a recirculation heat exchanger (e.g., as shown in FIG. 3), the inerting system 400 includes a hot section fan 426. Specifically, the fan 426 is arranged upstream of the catalytic reactor 402 and downstream of an injection point 428 of the mixture of reactants (a first reactant from the fuel tank 404 and a second reactant from a second reactant source 430). The fan 426 may be a fan assembly, as shown and described herein, and configured to generate a pressure differential to enable control of a temperature of a gas at the inlet of the catalytic reactor 402. In some embodiments, the fan 426 may be a variable speed fan and operated such that a high speed results in a lower temperature at the inlet to the catalytic reactor 402.

The operation of the fan 426 may be such that relatively cool air from the cool cycle junction 418 and relatively hot air from the hot cycle junction 412 may be drawn along the inerting system flow path 410 upstream of the catalytic reactor 402. By pulling air from each of the cool cycle junction 418 and the hot cycle junction 412, the fan 426 can cause a mixing of the two flows of air at a mixing junction 432. The mixed air at the mixing junction 432, which is inert gas, will be pulled through the injection point 428 and mix with the mixture of reactants prior to entering the catalytic reactor 402.

The amount of inert gas pulled from the hot cycle junction 412 may be controlled, at least in part, by a hot cycle flow controller 434. In some configurations, the hot cycle flow controller 434 may be a passive component, such as an orifice or reduced cross-section of ducting/pipe. In other embodiments, the hot cycle flow controller 434 may be a passive or actively controlled flow metering valve. In some configurations, the hot cycle flow controller 434 may be operably controlled by the system controller 420. Similarly, the amount of inert gas pulled from the cool cycle junction 418 may be controlled, at least in part, by a cool cycle flow controller 436. In some configurations, the cool cycle flow controller 436 may be a passive component, such as an orifice or reduced cross-section of ducting/pipe. In other embodiments, the cool cycle flow controller 436 may be a passive or actively controlled flow metering valve. In some configurations, the cool cycle flow controller 436 may be operably controlled by the system controller 420. In some embodiments, for example, the cool cycle flow controller 436 may be an isolation valve that is controlled particularly at the time of system startup. When the cool cycle flow controller 436 is closed, all of the inert gas pulled by the fan 426 may be from the hot cycle junction 412 and thus a temperature of the mixed reactants supplied to the catalytic reactor 402 can be increased rapidly. After system start, the cool cycle flow controller 436 can be opened to allow a cool inert gas to be pulled through the system and enable temperature control at the inlet of the catalytic reactor 402.

As noted, the fan 426 is arranged in a relatively hot section of the inerting system flow path 410 (just upstream from the catalytic reactor 402). In this position, the fan 426 may be subject to temperatures of 185-250° C. or greater. This temperature is too high for normal operation of the fan 426, and thus a cooling scheme must be provided. In this example, the fan 426 is cooled with a portion of the relatively cool air extracted from the cool cycle junction 418. As shown, a fan cooling supply line 438 is arranged to extract a portion of the cool air from the cool cycle junction 418 and inject the cool air into the fan 426 and provide cooling thereto. In FIG. 4, points 440, 442 are connected, and the illustration is merely provided for clarity of the system.

Figure 5:
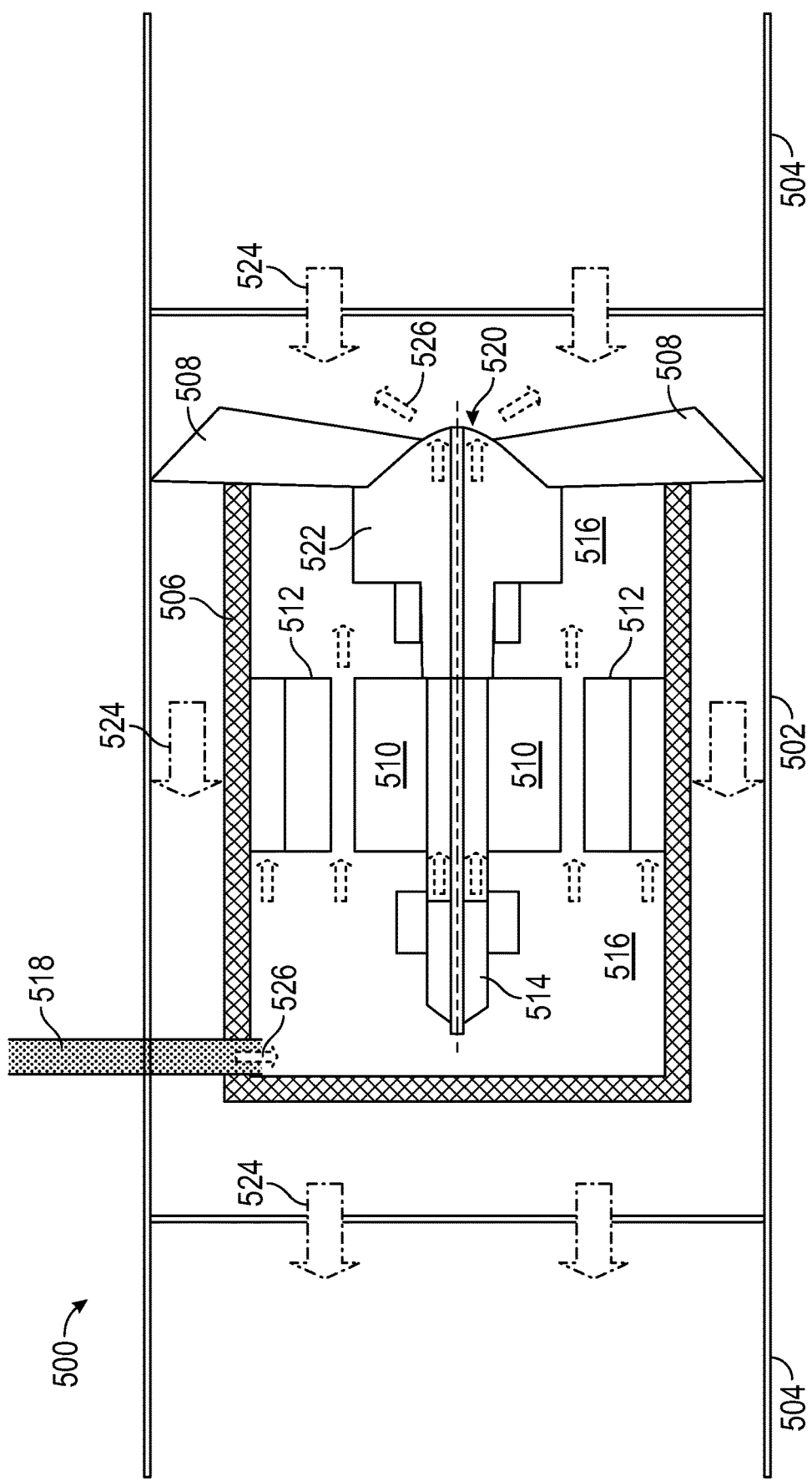
FIG. 5 is a schematic illustration of a fan assembly of a fuel tank inerting system in accordance with an embodiment of the present disclosure.

Turning now to FIG. 5, a schematic illustration of a portion of an inerting system 500 in accordance with an embodiment of the present disclosure is shown. The inerting system 500 includes a fan assembly 502, as shown and described above. As shown, a fan assembly 502 is arranged along an inerting system flow path duct 504. The fan assembly 502 includes a fan housing 506, one or more fan blades 508, a fan motor rotor 510, and a fan motor stator 512. The fan motor rotor 510 is operably coupled to a fan shaft 514 that drives rotation of the fan blades 508. The fan motor rotor 510 and the fan motor stator 512 form a fan motor that is configured to drive the fan shaft 514. The fan motor may have an upper limit operating temperature, and thus cooling thereof may be required.

The fan housing 506 defines a fan cooling cavity 516 that contains, at least, the fan motor rotor 510, the fan motor stator 512, and the fan shaft 514. The fan cooling cavity 516 is fluidly connected to fan cooling supply line 518 (e.g., fan cooling supply line 438 shown in FIG. 4). The fan housing 506 is formed, at least in part, from an insulating material, such as ceramic. The fan housing 506 is a substantially sealed container such that fluid flow into the fan cooling cavity 516 is only supplied from the fan cooling supply line 518 and fluid flow from the fan cooling cavity 516 is only through one or more orifices 520 formed in a fan hub 522.

As shown in FIG. 5, a reactant mixture 524 flows through the inerting system flow path duct 504 in a flow direction as indicated by the arrows on the figure. The reactant mixture 524 may have a composition of a first reactant (e.g., fuel), a second reactant (e.g., air), and, at times, a portion of inert gas supplied from one or more cycle junctions, as described above. The location of the fan assembly 502 along the inerting system flow path duct 504 is an upstream position relative to a catalytic reactor that receives and generates an inert gas from the reactant mixture 524. The reactant mixture 524 may have temperatures in excess of about 185° C., and in some embodiments may have a temperature range of about 185-250° C. To protect the components of the fan assembly 502 (e.g., the fan motor), cooling air 526 is supplied from the cooling supply line 518 and passes through the fan cooling cavity 516. The cooling air 526 may have a temperature of 70° C. or less, and is an inert gas, as described above. As such, cooling is provided to the components of the fan assembly 502. The cooling air 526 will exit the fan cooling cavity 516 through the one or more orifices 520 formed in the fan hub 522, and mix with the reactant mixture 524.

In some embodiments, the cooling air 526 is ensured to maintain cooling of the fan components and further prevents ingestion of the reactant mixture 524 into the fan cooling cavity 516. This is achieved by the cooling air 526 having a higher pressure than a pressure of the reactant mixture 524. It will be noted that upstream of the fan assembly 502, along the inerting system flow path duct 504 will be the lowest pressure point within the inerting system 500. That is, just downstream of a location of injection/mixing of the first and second reactants and upstream of the fan assembly 502 will be the lowest pressure point within the system. As such, the cooling air 526 supplied from the cooling supply line 518, which pulls inert gas from a cool cycle junction, will have a higher pressure than the reactant mixture 524 that is external to the fan housing 506.

Advantageously, embodiments described herein provide for an inerting system architecture that can lower system impedance and address system start-up challenges associated with systems that include a recirculation heat exchanger. By using only a single condenser heat exchanger, placing a fan in a hot section of the system, and eliminating the recirculation heat exchanger, embodiments described herein enable lower system impedance for achievable fan design (less fan pressure ratio).

For example, the architecture system impedance in accordance with embodiments of the present disclosure is between 0.65 psid-1.2 psid. This provides for about a 1.35 psid to about 4.35 psid system impedance reduction compared to prior system architecture designs (e.g., having a recirculation heat exchanger). For smaller volume (e.g., about 6,000 gallons) inerting systems, typical impedance is about 2 psid, whereas, by implementing a fan assembly as described herein, embodiments of the present disclosure with a similar volume have an impedance of about 0.65 psid (resulting in about 1.35 psid system impedance reduction). For larger volume systems (e.g., about 40,000 gallons) inerting systems, typical impedance is about 5.55 psid, whereas, by implementing a fan assembly as described herein, embodiments of the present disclosure with a similar volume have an impedance of about 1.2 psid (resulting in about 4.35 psid system impedance reduction).

Reducing system impedance becomes increasingly important for the large ullage size inerting systems. As a result, embodiments of the present disclosure provide for significant advantages. Further, by implementing embodiments as described herein, the architectures (which, for example, remove a recirculation heat exchanger or move fan assembly to hot section relative to other possible architectures) may be scalable across different ullage sizes.

Furthermore, advantageously, embodiments of the present disclosure enable placement of a fan within a hot section of the inerting flow path. Typically, architectures focus on placing a fan in a relatively low temperature zone (e.g., about 100° C. or less; but potentially up to about 166° C.). However, embodiments described herein enable the placement and operation of a fan within a section of the system having 185° C. temperatures or greater (e.g., 185-250° C.). This is enabled by active cooling of the fan components such that a fan motor may be maintained at about 70° C. or less (e.g., a maximum of about 70° C.). Further, advantageously, ducting of inerting systems may be reduced, which can provide both space and weight savings onboard aircraft. For example, a reduction of up to 50% in duct size and weight may be achieved for an inerting system of constant volume, by implementing embodiments described herein, as compared to other configurations of such systems. Stated another way, for a given inerting system volume, the duct size can be reduced by up to 50%, while maintaining the necessary inert gas generation.

The use of the terms "a," "an," "the," and similar references in the context of description (especially in the context of the following claims) are to be construed to cover both the singular and the plural, unless otherwise indicated herein or specifically contradicted by context. The modifier "about," "substantially," and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description, but is only limited by the scope of the appended claims.

What is claimed is:

1. A fuel tank inerting system, the system comprising:
a fuel tank;
a catalytic reactor arranged to receive a reactant mixture comprising a first reactant and a second reactant to generate an inert gas to be supplied to the fuel tank to fill an ullage space of the fuel tank, wherein the first reactant is fuel and the second reactant is air;
a condenser heat exchanger arranged between the catalytic reactor and the fuel tank and configured to cool an output from the catalytic reactor; and
a fan assembly arranged within an inerting system flow path upstream of the catalytic reactor, wherein, in use, the fan assembly is arranged within a gas flow having a temperature of at least 185° C.,
wherein the fan assembly comprises a fan housing with a fan motor arranged within the fan housing and configured to drive operation of the fan assembly, and
wherein cool air is supplied into the fan housing to provide cooling to fan components of the fan assembly and prevent ingestion of gas of the gas flow.

2. The fuel tank inerting system of claim 1, wherein the fan assembly includes a variable speed fan.

3. The fuel tank inerting system of claim 1, wherein:
the fan housing defines a fan cooling cavity; and
a fan motor rotor and a fan motor stator are arranged within the fan cooling cavity,
wherein, in use, an air temperature within the fan cooling cavity is 70° C. or less.

4. The fuel tank inerting system of claim 1, wherein the fan assembly further comprises:
a fan shaft operably coupled to the fan motor and configured to be driven by the fan motor;
a fan hub arranged on an end of the fan shaft; and
one or more fan blades extending from the fan hub, wherein the fan blades extend into the inerting system flow path.

5. The fuel tank inerting system of claim 1, wherein the fan housing comprises an insulating material.

6. The fuel tank inerting system of claim 1, wherein the inerting system flow path comprises:
a hot cycle junction downstream from the catalytic reactor and upstream from the condenser heat exchanger; and
a cool cycle junction downstream from the condenser heat exchanger and upstream from the fuel tank.

7. The fuel tank inerting system of claim 6, wherein a portion of inert gas is directed upstream from the hot cycle junction.

8. The fuel tank inerting system of claim 6, wherein cool inert gas from the cool cycle junction is supplied to the fan assembly to provide cooling to the fan assembly.

9. The fuel tank inerting system of claim 6, wherein the hot cycle junction is configured to direct hot inert gas to a location upstream of the catalytic reactor to be mixed with the reactant mixture.

10. The fuel tank inerting system of claim 9, further comprising a hot cycle flow controller arranged between the hot cycle junction and the fan assembly, wherein the hot cycle flow controller is configured to control a flow of hot inert gas.

11. The fuel tank inerting system of claim 10, wherein the hot cycle flow controller is one of a valve and an orifice arranged along the inerting system flow path.

12. The fuel tank inerting system of claim 6, wherein the cool cycle junction is configured to direct cool inert gas to a location upstream of the catalytic reactor to be mixed with the reactant mixture.

13. The fuel tank inerting system of claim 12, further comprising a cool cycle flow controller arranged between the cool cycle junction and the fan assembly, wherein the cool cycle flow controller is configured to control a flow of cool inert gas.

14. The fuel tank inerting system of claim 13, wherein the cool cycle flow controller is an isolation valve.

15. The fuel tank inerting system of claim 1, wherein the cool air is a cool inert gas sourced from a location downstream of the condenser heat exchanger along the inerting system flow path.

16. The fuel tank inerting system of claim 1, wherein the fuel tank inerting system does not include a recirculation heat exchanger.

17. The fuel tank inerting system of claim 1, further comprising a water collector arranged downstream from the condenser heat exchanger along the inerting system flow path.

18. The fuel tank inerting system of claim 1, wherein, in use, the gas flow around the fan assembly is between about 185° C. and about 250° C.

19. The fuel tank inerting system of claim 6, wherein a portion of inert gas is directed upstream from the cool cycle junction.

20. The fuel tank inerting system of claim 15, wherein the cool inert gas received by the fan assembly is injected into the reactant mixture within the inerting system flow path.

* * * * *